United States Patent

Wu et al.

[11] Patent Number: 5,534,801
[45] Date of Patent: Jul. 9, 1996

[54] APPARATUS AND METHOD FOR AUTOMATIC SENSE AND ESTABLISHMENT OF 5V AND 3.3V OPERATION

[75] Inventors: Chih-Siung Wu, Saratoga; Po-Shen Lai, San Jose, both of Calif.

[73] Assignee: Advanced Micro Devices, Inc., Sunnyvale, Calif.

[21] Appl. No.: 185,137

[22] Filed: Jan. 24, 1994

[51] Int. Cl.⁶ .................................................. H03K 5/153
[52] U.S. Cl. ................................ 327/72; 327/77; 327/545
[58] Field of Search ................................ 327/72, 77, 78, 327/530, 538, 544, 545, 58, 60, 62; 365/189.09

[56] References Cited

U.S. PATENT DOCUMENTS

| | | | |
|---|---|---|---|
| 4,473,759 | 9/1984 | Mahabadi | 327/530 |
| 5,187,396 | 2/1993 | Armstrong, II et al. | 327/530 |
| 5,343,086 | 8/1994 | Fung et al. | 327/77 |
| 5,378,936 | 1/1995 | Kokubo et al. | 327/77 |

OTHER PUBLICATIONS

Patent Abstracts of Japan, vol. 18, No. 460 (P–1793) 26 Aug. 1994 & JP–A–61 049 395 (Okamoto) 27 May 1994 * abstract *.

Finis et al., "Voltage Monitor Circuit", RCA Technical Notes, No. 1240, 23 May 1980, Princeton US, p. 1240, * the whole document *.

Patent Abstracts of Japan, vol. 16, No. 483 (P–1432) 7 Oct. 1992 & JP–A–41 072 588 (Mitsubishi) 19 Jun. 1992 * abstract *.

*Primary Examiner*—Toan Tran
*Attorney, Agent, or Firm*—Fliesler, Dubb, Meyer & Lovejoy

[57] ABSTRACT

An interface circuit is provided for connecting to a multi-mode signal bus. The signal bus (e.g., a PCI local bus) can operate in either a first or second signaling mode. The first signaling mode is one in which discrete logic levels (e.g., binary "0" and "1") are represented by a first set of voltage levels (e.g., 0V–5V). The second signaling mode is one in which discrete logic levels are represented by a different, second set of voltage levels (e.g., 0V–3.3V). The interface circuit includes an intermediate level generator circuit for generating, from the first voltage level (5V), an intermediate voltage level (V4) between the possible voltage levels of the first and second signaling modes (V5 and V3). A comparator compares the power level of the signal bus against the intermediate voltage level (V4) and determines which signaling mode the signal bus is operating in. Configurable I/O cells of the interface circuit are then automatically configured to operate in the corresponding signaling mode (V5 or V3).

7 Claims, 4 Drawing Sheets

FIG. 3
INPUT BUFFER

FIG. 5A

FIG. 5B

APPARATUS AND METHOD FOR AUTOMATIC SENSE AND ESTABLISHMENT OF 5V AND 3.3V OPERATION

BACKGROUND

1. Field of the Invention

The invention relates generally to digital systems. The invention relates more specifically to digital circuits that are to operate in a selected one of plural voltage-signaling modes, e.g., a 3.3V mode or a 5V mode.

2a. Cross Reference to Related Applications

The following copending U.S. patent application(s) is/are assigned to the assignee of the present application, is/are related to the present application and its/their disclosures is/are incorporated herein by reference:

(A) Ser. No. 08/186,050 [Attorney Docket No. AMDI8019] filed concurrently herewith by Chih-Siung Wu et al, and entitled, INTEGRATED SCSI AND ETHERNET CONTROLLER ON A PCI LOCAL BUS; and (B) Ser. No. 08/184,295 [Attorney Docket No. AMDI8024] filed Jan.21, 1994 by Chih-Siung Wu et al, and entitled, APPARATUS AND METHOD FOR INTEGRATING BUS MASTER OWNERSHIP OF LOCAL BUS LOAD BY PLURAL DATA TRANSCEIVERS.

2b. Cross Reference to Related Other Publications

The following publication(s) is/are believed to be related to the present application and is/are cited here for purposes of reference:

(A) PCI Local Bus Specification, Revision 2.0, Apr. 30, 1993; available from PCI Special Interest Group, 5200 N.E. Elam Young Parkway, Hillsboro, Oreg. (USA) 97124.

3. Description of the Related Art

The 5 volt DC level has served as a standard power supply value for TTL (Transistor-Transistor Logic) and like digital systems for many years.

Recently, the industry has begun to adopt an alternate, 3.3 volt DC level as a standard for powering high-density, high-speed, integrated circuits. This presents the problem that some designs are expected to operate in a 5V signaling mode, some designs are expected to operate in a 3.3V signaling mode and some designs are expected to operate in a hybrid environment that uses both the 5V and the 3V signaling modes.

An example of the possibility for such multi-mode operation is found in the recently introduced, "PCI local bus" standard. PCI stands for Peripheral Component Interconnect. The standard is specified by the PCI Special Interest Group of Hillsboro, Oreg. (USA). One of the PCI specifications (PCI sections 4.2.1 and 4.2.2) is that digital signals on the PCI local bus can be of either:

(A) the 5V digital signaling type, wherein a logic low ("0") is to be represented by a voltage level in the range −0.5V to 0.8V and a logic high ("1") is to be represented by a voltage level in the range 2.0V to $V_{cc}$+0.5V, $V_{cc}$ being in the range 4.75 to 5.25V; or (B) the 3.3V digital signaling type, wherein a logic low ("0") is to be represented by a voltage level in the range −0.5V to $0.325V_{cc}$ and a logic high ("1") is to be represented by a voltage level in the range $0.475V_{cc}$ to $V_{cc}$+0.5V, $V_{cc}$ being in the range 3.0 to 3.6V.

To be truly PCI-compliant, an on-bus device has to be capable of operating in either the 5V or 3.3V signaling mode. But a shift from one signaling environment to another (e.g., from 5V to 3.3V) calls for making certain changes in fundamental parameters of input and output circuits. More specifically, the switching threshold of each inverter or other logic gate on a dual-mode bus has to be appropriately reduced when a change is made from a 5V signaling mode to a 3.3V signaling mode. And if an output buffer on the dual-mode bus is to source or sink predefined minimum currents (e.g., 44 mA of pull-up current), the internal pull-up resistance (and/or tie-down resistance, if any) of the buffer has to be appropriately decreased when the change is made from a 5V signaling mode to a 3.3V signaling mode so that the same current levels can be maintained even though the drive voltage is lowered.

It has been proposed that a dedicated, mode-indicating pin should be included on every integrated circuit chip to indicate to the internal circuitry of the chip whether an external bus is of the 5V signaling type or of the 3.3V signaling type. The internal circuitry of the chip would then reconfigure itself in response to such an indication to conform with 5V signaling requirements or 3.3V signaling requirements.

Such an arrangement has the disadvantage of reducing the number of pins available for other functions on an IC package of a fixed pin count. It also adds complexity to the printed circuit board on which one or more such dual-mode chips are mounted because an extra trace has to be routed to the dedicated, 5V/3.3V-indicating pin of each dual mode chip. Circuit manufacturers have to go through the expense of testing this extra circuitry and setting its level to one or the other of opposed levels in order to properly indicate 5V or 3.3V operation.

SUMMARY OF THE INVENTION

The invention overcomes the above-mentioned problems by providing a method and apparatus for apparatus and method for automatic sense and establishment of 5V or 3.3V operation.

In a broader sense, the invention is applicable to multi-mode situations that use any other ranges of operating voltages to distinguish between discrete logic levels. Thus a broader summary entails the automatic sense and establishment of one of a plurality of possible signaling modes.

An auto-sensing circuit is provided in accordance with a first aspect of the invention for determining whether a signal bus (e.g., a PCI local bus) is operating in a first or second signaling mode. The first signaling mode is one in which discrete logic levels (e.g., binary "0" and "1") are represented by a first set of voltage levels (e.g., 0V–5V). The second signaling mode is one in which discrete logic levels are represented by a different, second set of voltage levels (e.g., 0V–3.3V). The signal bus has a bus power line and a bus ground line across which there is established the maximum level ($V_{3/5}$) of either the first or the second set of voltage levels in accordance with the signaling mode of the signal bus. The auto-sensing circuit comprises: (a) an intermediate level generator for generating an intermediate test level (V4) whose value is between the possible maximum levels (V5 and V3) of the first and second sets of voltage levels; and (b) a comparator that receives the levels generated on the bus power line and by the intermediate level generator, compares the received voltage levels ($V_{3/5}$ versus v4), and determines thereby whether the signal bus is operating in the first or second signaling mode (e.g., 5V or 3.3V).

In accordance with a further aspect of the invention, the auto-sensing circuit is provided within an integrated circuit having I/O cells that interface with the multi-signaling mode bus. Each I/O cell is configurable to operate in one of the multiple signaling modes. The on-chip, auto-sensing circuit automatically configures each I/O cell to operate in the signaling mode of the attached signal bus.

BRIEF DESCRIPTION OF THE DRAWINGS

The below detailed description makes reference to the accompanying drawings, in which.

DETAILED DESCRIPTION

Figure 1:
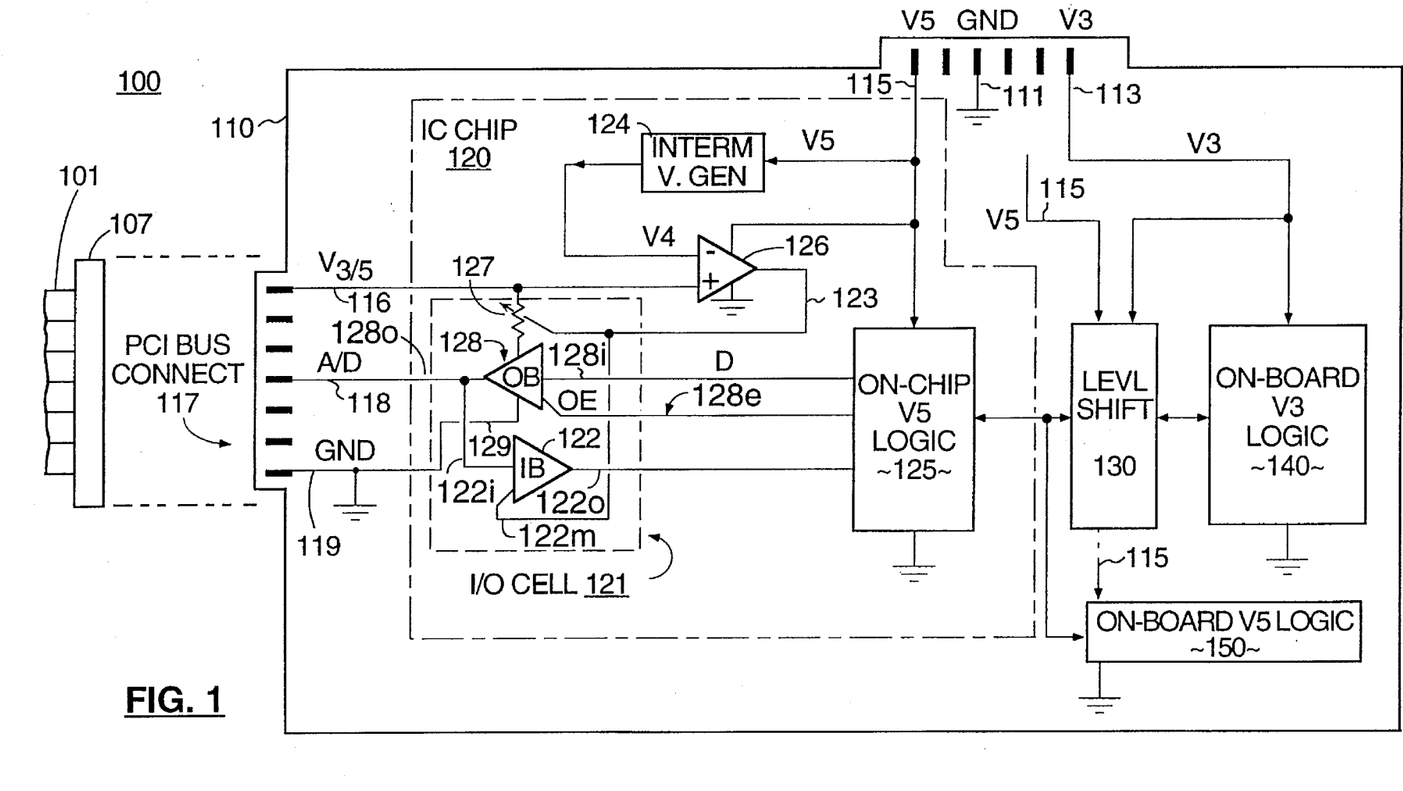
FIG. 1 is a block diagram of an auto-sensing system in accordance with the invention.

FIG. 1 shows a block diagram of an auto-sensing system 100 in accordance with the invention. The auto-sensing system 100 is provided on a printed circuit board 110 having at least first and second power rails, 111 and 115, to which there are supplied, respectively, a ground level GND, and a primary power supply level $V_5$. A secondary power supply level $V_3$ is optionally provided on a third, on-board power rail, 113.

In one particular embodiment, the primary power supply level $V_5$ is set to the standard 5V signaling range of 4.75 to 5.25V, the secondary power supply level $V_3$ is set to the standard 3.3V signaling range of 3.0 to 3.6V, and the ground level GND is set to 0V. It is to be understood, however, that these are not the only values possible in the practice of the invention. More generally, the relationship of below inequality, Eq. 1, is established:

$$GND < V_3 < V_4 < V_5 \quad \{Eq. 1\}$$

where $V_4$ is an intermediate level between the secondary power supply level $V_3$ and the primary power supply level $V_5$.

The printed circuit board 110 of FIG. 1 includes a bus connector 117 for connecting to a signal bus 101. Signal bus 101 can optionally operate in one of plural, voltage-signaling modes, e.g., a 3.3V mode or a 5V mode. The board's connector 117 mates with a counterpart expansion slot 107 of the signal bus 101. A plurality of digital signal lines 118 (only one shown) are included in the signal bus 101 and on bus connector 117 for conducting digital signals that use either the $V_5$ signaling mode or the $V_3$ signaling mode. In the case where signal bus 101 is a PCI local bus, lines 118 include bidirectional address/data lines (A/D lines) that use a time multiplexing scheme to conduct address and data signals operating either in the 0V-to-5V range or in the 0V-to-3.3V range.

A $V_{3/5}$ bus power line 116 is included in the signal bus 101 and on bus connector 117 for carrying either the primary power supply level $V_5$ or the secondary power supply level $V_3$ in correspondence to the signaling mode used by the bus signal lines 118. A GND bus power line 119 is further included in the signal bus 101 and on bus connector 117 for returning current ("sinking" current) that is sourced from either or both of the $V_{3/5}$ bus power line 116 and the bus signal lines 118.

The operating level of the $V_{3/5}$ bus power line 116 (e.g., $V_5$ or $V_3$) may be established either on board 110, by connecting a corresponding one of the on-board power rails, 115 and 113, to line 116; or off-board, by a connection made elsewhere along the signal bus 101, off of printed circuit board 110. It is assumed here, for purposes of example, that the $V_{3/5}$ level of power line 116 is established off-board, somewhere else along the signal bus 101. Thus, the designers of printed circuit board 110 do not know whether the signal bus 101 will be operating in the $V_5$ signaling mode or the $V_3$ signaling mode. Board 110 is to be designed so that it can operate with either mode.

A bus-interfacing integrated circuit (IC) 120 is provided on printed circuit board 110 for coupling the signal bus 101 to other circuitry (e.g., 130, 140, 150) of the printed circuit board 110.

The bus-interfacing IC 120 may need to adhere to predefined loading specifications of the signal bus 101. For example, in the case where signal bus 101 complies with the "PCI local bus" standard, it is desirable to design the bus-interfacing IC 120 such that it appears as no more than one PCI "load" to the remainder of the PCI local bus.

A PCI local bus features a 32-bit wide, multiplexed address-data (AD) bus portion that is specified for operating at data exchange rates as high as 132 megaBytes per second (132 MB/s peak). A performance upgrade path is specified for expanding the bus to include a 64-bit wide AD bus portion capable of operating at up to 264 MB/s peak. The high data throughput rate of the PCI local bus is due in part to a fixed limitation that is placed on the number of electrical AC and DC "loads" that may be attached to the bus while still maintaining peak performance (e.g., a 33 MHz clock rate). The speed of the PCI local bus is owed in further part to another limitation that is placed on the physical length and on the capacitance of the conductor traces and connection pins that define the bus.

Each PCI "load" typically has a capacitance of between 15 to 25 picoFarads (15–25 pF) per pin. The electrical-load, capacitance, and physical-size parameters of a PCI-compliant bus have to be jointly configured in order to assure a clock skew of less than a prespecified first amount (2 nS) for synchronous operations between any two PCI bus devices and a data signal propagation time of less than a second prespecified amount (10 nS). Current technology appears to allow for no more than four expansion slots (such as slot 107) on any one PCI local bus. Each combination of a conventional expansion connector plus a conventional expansion board is expected to consume no more than approximately two PCI "loads". Each IC chip that connects directly to the PCI local bus without using an expansion connector (117/107) is expected to consume no more than approximately one PCI "load". The PCI local bus is allowed no more than 10 loads under current specifications. Thus, four expansion slots and two direct-connect IC's are expected to consume all of the allowed 10 loads of the PCI local bus.

A bus-interfacing portion of IC 120 has a plurality of I/O cells 121 (only one shown) for coupling directly to the signal bus 101. Each I/O cell 121 includes one or both of an input buffer (IB) 122 and a tristate output buffer (OB) 128.

The input buffer (IB) 122 has an IB input line 122i coupled to a corresponding bus signal line 118 and an IB output line 122o coupled to chip-internal logic 125. The chip-internal logic 125 may operate fixedly in a V5 signaling mode or a V3 signaling mode. The illustrated example assumes a V5 signaling mode. Chip-internal logic 125 is powered by a chip-internal V5 line that draws its power from the board's V5 power rail 115. The output line 122o of buffer 112 correspondingly operates in the fixed V5 signaling mode to interface with the chip-internal logic 125.

The IB input line 122i can receive digital signals operating in either the V5 or V3 signaling mode. A mode-select line 122m of input buffer (IB) 122 switches the input switching threshold of buffer 122 so that buffer 122 can appropriately distinguish between logic low ("0") and logic high ("1") in a corresponding one of the V5 and V3 signaling modes.

The output buffer (OB) 128 of each interface cell 121 has an OB output line 128o coupled to a corresponding bus signal line 118 and an OB input line 128i coupled to receive digital data signals from the chip-internal logic 125. Each interface output buffer (OB) 128 further has a tristate output-enable (OE) line 128e for placing the output 128o of the buffer 128 in either a high-impedance (Hi-Z) mode or in a low-impedance line-driving mode. The OB output-enable line 128e is driven by the chip-internal logic 125.

When placed in the low-impedance line-driving mode, the interface output buffer (OB) 128 receives sourcing current from the $V_{3/5}$ bus power line 116, by way of a variable pull-up resistor 127. The current flow through variable pull-up resistor 127 is used for sourcing a current signal out through the OB output terminal 128o onto the corresponding bus signal line 118. This raises the voltage of signal line 118 to the $V_{3/5}$ level.

When the voltage of signal line 118 is to be dropped to the GND level, the output buffer (OB) 128 discharges the corresponding bus signal line 118 by passing discharge current through its buffer output 128o to the GND bus power line 119. The discharge current passes by way of a current-sink lead 129 ($V_{SS}$ pin) to a point outside the chip 120. The current-sink lead 129 ($V_{SS}$ pin) typically connects outside the chip 120 to the GND bus power line 119.

A signaling-mode control line 123 connects to the IB mode-select line 122m of each interface input buffer 122 and to the variable pull-up resistor 127 of each interface output buffer (OB) 128 for placing the respective IB input 122i and OB buffer output 128o in either a V5 signaling mode or a V3 signaling mode. The signaling-mode control line 123 is driven by comparator 126. A plus (+) input terminal of comparator 126 connects to the $V_{3/5}$ bus power line 116. A minus (−) input terminal of comparator 126 connects to a V4 level line. The V4 level line is driven by an on-chip, intermediate level generator circuit 124. The intermediate level generator circuit 124 generates a V4 voltage level onto the V4 level line so as to satisfy the above-mentioned inequality, $GND<V_3<V_4<V_5$.

Comparator 126 compares the voltage level on the $V_{3/5}$ bus power line 116 against the voltage level provided on the V4 level line. If the voltage level on the $V_{3/5}$ bus power line 116 is greater than V4, then comparator 126 outputs a digital signal onto the signaling-mode control line 123 to indicate that the OB buffer output 128o and the IB input 122i are to operate in the V5 signaling mode. If the voltage level on the $V_{3/5}$ bus power line 116 is less than V4, then comparator 126 outputs a digital signal onto the signaling-mode control line 123 to indicate that the OB buffer output 128o and the IB input 122i are to operate in the V3 signaling mode. The input buffer 122 and output buffer 28 of each bus-interface cell 121 is then automatically configured accordingly.

Figure 2:
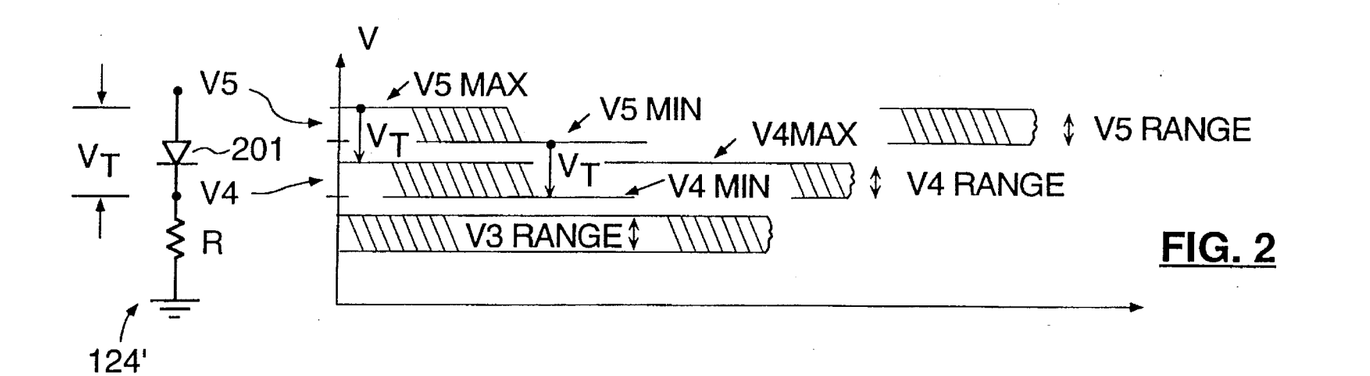
FIG. 2 is a schematic diagram of an intermediate level generator circuit in accordance with the invention.

Many different circuits may be used for implementing the intermediate level generator circuit 124. FIG. 2 shows one such implementation 124'. Implementation 124' may be used for the case where the minimum voltage difference between the V5 and V3 levels is greater than one diode threshold drop and the V5 variability range is less than one diode threshold drop. An example is when V5 is in the range 4.75 to 5.25V and V3 is in the range 3.0 to 3.6V. One diode threshold drop ($V_T$=0.6V) below the V5 range produces the intermediate test range of V4=4.19 to 4.69 volts, which is distinguishable from the V3 range.

In FIG. 2, the anode of silicon diode 201 connects to the chip-internal V5 line while the cathode connects to a chip-internal resistor R. The other end of resistor R couples to the chip-internal ground. A single diode threshold drop (a $V_T$ of approximately 0.5 to 0.6V) develops across diode 201 to produce the intermediate test level, $V_4=V_5-V_T$.

As seen in the graph of FIG. 2, the $V_4$ range (worst case minimum to worst case maximum) is easily distinguishable from the $V_3$ and $V_5$ ranges.

Referring back to FIG. 1, the combination of the intermediate level generator circuit 124 and the comparator 126 therefore defines an automatic mode sensing means for determining whether the dual-mode signal bus 101 is operating in the $V_5$ signaling mode or in the $V_3$ signaling mode. The signaling-mode control line 123 is used to automatically place each of the dual-mode I/O cells 121 in the corresponding $V_5$ or $V_3$ interface mode.

Although the chip-internal logic 125 is shown by way of example to be V5-only logic, it could just as well have been V3-only logic. In the latter case, a V3 line would drive the V3 chip-internal logic (125', not shown) and a voltage-divider reduced version of the $V_{3/5}$ voltage would be supplied to the comparator 126 for comparison against a corresponding V4 level to determine if the signal bus 101 is in the V5 or V3 signaling mode.

Chip-internal logic 125 couples to off chip logic such as the illustrated on-board V5 logic unit 150 or by way of level shifter 130 to the illustrated (optional) on-board V3 logic unit 140. Designers of printed circuit board 110 do not have to worry about whether the signal bus 101 is operating in the V5 or V3 signaling mode since bus-interfacing IC 120 automatically senses the bus signaling mode and correspondingly adjusts its I/O interface cells 121 for V5 or V3 operation.

Figure 3:
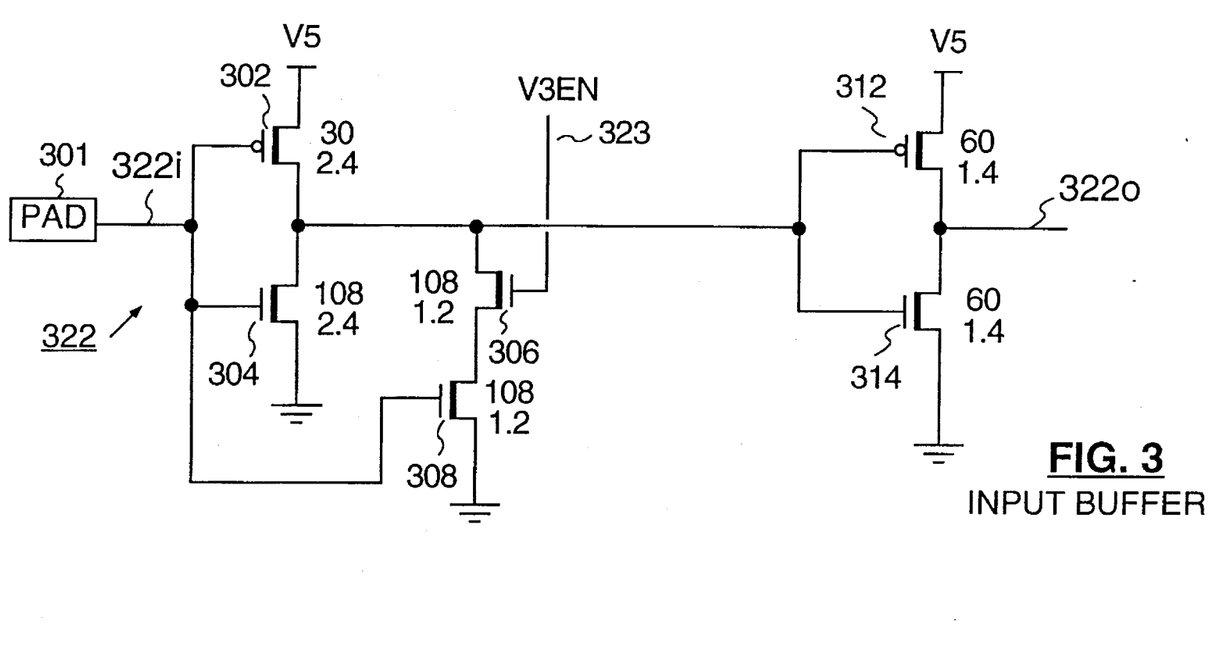
FIG. 3 is a schematic diagram of a CMOS-based input buffer of the auto-sensing system.

Referring to FIG. 3, a schematic diagram of a CMOS (complementarymetal-oxide-semiconductor) implementation 322 of input buffer 122 is shown. IC pad 301 supplies input signal 3226i to the gates of P-channel transistor 302 and N-channel transistors 304 and 308. Input signal 322i can be in either a V5 or V3 signaling mode.

P transistor 302 has channel width/length parameters of 30/2.4 in terms of microns. N transistor 304 has channel width/length parameters of 108/2.4. N transistor 308 has channel width/length parameters of 108/1.2. Another N-channel transistor 306 is provided within the circuit having channel width/length parameters of 108/1.2. The sum of the channel lengths of N transistors 308 and 306 is substantially equal to the channel length of N transistor 304. The channel width of each of N transistors 308 and 306 is substantially equal to the channel width of N transistor 304.

The source of P transistor 302 connects to positive voltage level V5 while the sources of N transistors 304 and 308 connect to ground. The drain of P transistor 302 ties to the drains of N transistors 304 and 306. The drain of N transistor 308 connects to the source of N-channel transistor 306. The gate of N-channel transistor 306 is driven by a V3EN signal (enable V3 mode) provided on mode-indicating line 323.

When the V3EN signal is low (at or near ground), N-channel transistor 306 is turned off and transistors 302, 304 define a CMOS inverter having an N-channel to P-channel width ratio of 108/30. When the V3EN signal is high (at or near V5), N-channel transistor 306 is turned on (switched to the conductive state) and transistors 302, 304 and 308 then define a CMOS inverter having an N-channel to P-channel width ratio of 216/30.

The inverter formed by transistors 302–308 has a switching point in the middle of either the V5 or V3 signaling mode range depending on whether the V3EN signal is respectively low or high. A subsequent inverter is formed by P transistor 312 (width/length=60/1.4) and N transistor 314 (width/length=60/1.4). The output signal 322o of input buffer 322 develops at the tied-together drains of transistors 312 and 314. The gates of transistors 312 and 314 connect to the drains of transistors 302, 304 and 306. The source of P transistor 312 connects to V5 while the source of N transistor 314 ties to ground.

Figure 4:
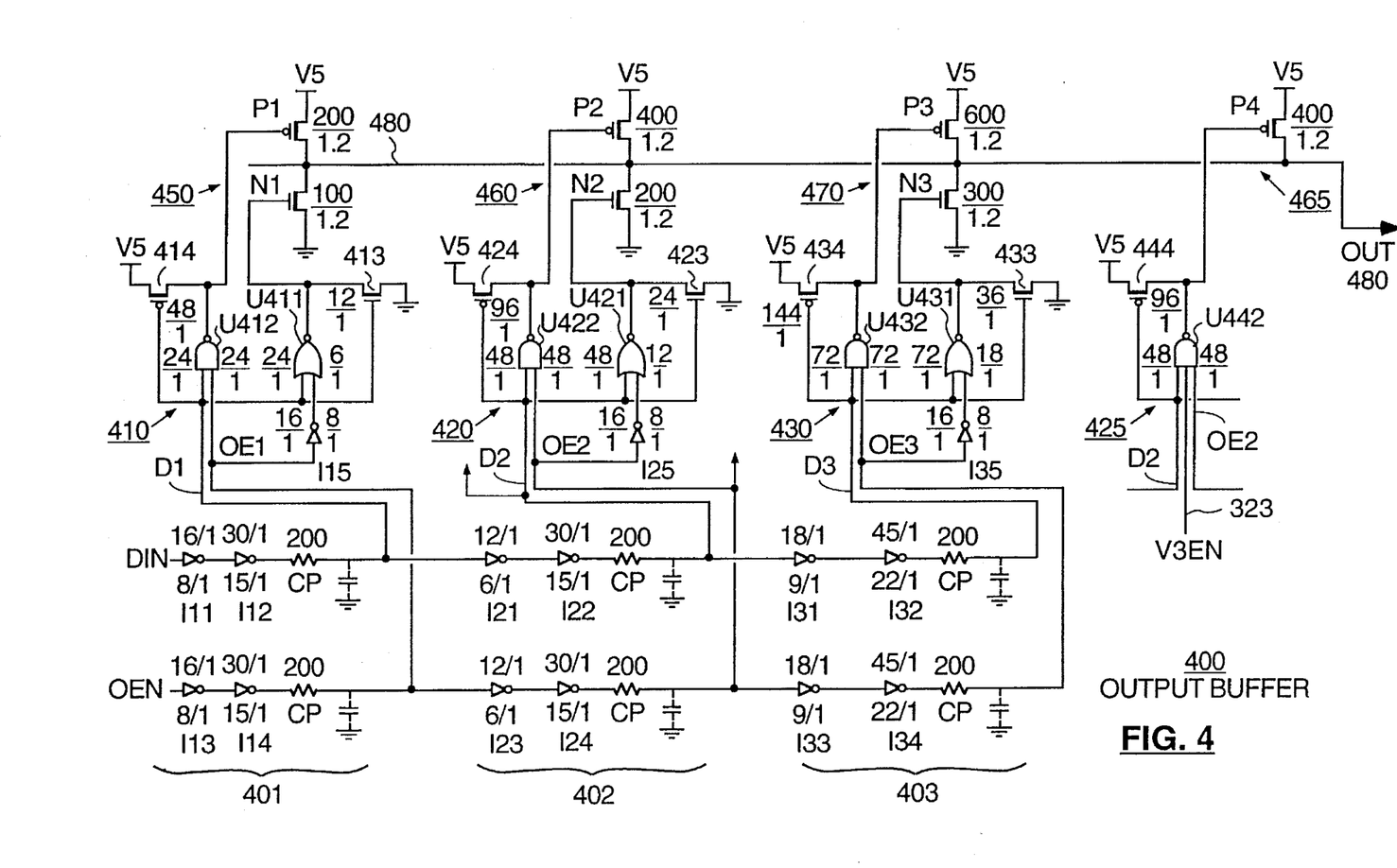
FIG. 4 is a schematic diagram of a CMOS-based output buffer of the auto-sensing system.

FIG. 4 is a schematic diagram of a CMOS (complementary metal-oxide-semiconductor) implementation 400 of output buffer 128. The output buffer design is subdivided into first through third delay stages 401–403 which respectively produce time-delayed versions D1, D2, and D3 of the input digital data DIN and correspondingly delayed versions OE1, OE2 and OE3 of a supplied output enable signal OEN. Delay stages 401, 402, 403 drive respective tristate logic modules 410, 420 and 430. Delay stage 402 also drives a partial tristate logic module 425. Tristate logic modules 410, 420 and 430 drive respective output power modules 450, 460 and 470. Partial tristate logic module 425 drives an additional output power module 465.

The partial tristate logic module 425 is enabled by the V3EN signal (line 323) so that the fourth output power module 465 is brought into play when the V3 signaling mode is indicated and so that the fourth output power module 465 is disabled from sourcing output current when the V5 signaling mode is indicated.

Other features of output buffer implementation 400 are as follows. Each of delay stages 401, 402, 403 is formed of first and second sequential inverters such as I11, I12 followed by an RC circuit. The respective channel widths/lengths of the P-channel transistors in each inverter of FIG. 4 are indicated by the ratio placed above or to the left of the device. The respective channel widths/lengths of the N-channel transistors in each inverter are indicated by the ratio placed below or to the right of the device. (The same is true for the illustrated NAND and NOR gates such as U412 and U411.) The RC circuit of each delay stage 401, 402, 403 includes a 200Ω resistance and a parasitic capacitor CP whose capacitance is defined by the thickness of the gate oxide used to form internal transistors of the corresponding inverters. (CP is primarily defined by the input gate capacitance of the CMOS circuit that the 200Ω resistance feeds.)

The series arrangement of inverter-defined and RC-defined delay sections provides tolerance for mass-production variation in oxide thickness. As gate oxide gets thinner, the signal propagation time of the inverters shortens, but the capacitance of the parasitic capacitor CP increases. The increased time constant of the RC delay section counters at least part of the decreased propagation time of the corresponding inverters. This mechanism minimizes process-variance for the time delay of each stage (401, 402, 403).

When output line 480 is switched into a current-sourcing mode, where it is to output current from the V5 power line; the switching on of power transistors P1, P2, P3 and optionally P5 is staggered over time so as to shape the waveform of the output current, and to limit di/dt, and thereby limit ground bounce effects (Ldi/dt) across the chip's V5 leads ($V_{DD}$ pins). Power transistor P1 turns on first in output power module 450, thereby bringing its 200 micron channel width on line. Power transistor P2 turns on a short time later in output power module 460 to add the contribution of its 400 micron channel width to the current flow of output line 480. The total, turned-on (conductive) channel width is then 600 microns. When power transistor P3 comes on a short time afterwards, the combined conductive channel width of power transistors P1–P3 becomes 1200 microns. Thus the over-time transition in the V5 mode for current sourcing is 200, 600 and then 1200 microns. If the V3 mode is active (V3EN is high on line 323), then power transistor P4 comes on line at approximately the same time as power transistor P2, and the over-time transition in the V3 mode for current sourcing is 200, 1000 and then 1600 microns.

A similar, staggered turn-on scheme is used for successively activating the current-sinking power transistors N1, N2 and N3 when output line 480 is to be brought low. There is no N4 power transistor in this particular implementation and the sequence of total turned-on channel width is the same 100, 300 and then 600 microns for both the V5 and V3 modes.

There is the danger that one of the P-channel power transistors, P1, P2, P3, P4, might be still turned on when an attempt is made to simultaneously turn on one of the N-channel power transistors, N1, N2, N3. N-channel transistors 413, 423 and 433 are provided in respective tristate logic modules 410, 420 and 430 for keeping the corresponding N-channel power transistors, N1, N2, N3 turned off until the respective time-delayed data signal, D1, D2 or D3 rises above the threshold level of corresponding transistor 413, 423 or 433.

In similar fashion, there is the danger that one of the N-channel power transistors, N1, N2, N3, might be still turned on when an attempt is made to simultaneously turn on one of the P-channel power transistors, P1, P2, P3, P4. P-channel transistors 414, 424, 434 and 444 are provided in respective tristate logic modules 410, 420, 430 and 425 for keeping the corresponding P-channel power transistors, P1, P2, P3. P4 turned off until the respective time-delayed data signal, D1, D2 or D3 drops below the threshold level of corresponding transistor 414, 424, 434 or 444.

Figure 5A:
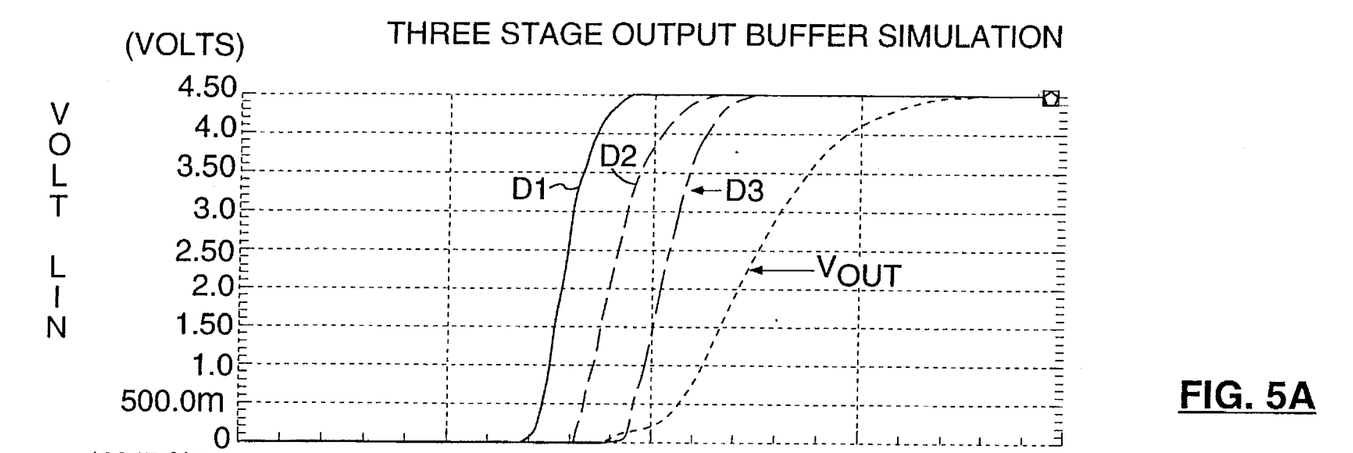
FIGS. 5A and 5B are respective plots of voltage and current curves developed in the output buffer of FIG. 4.
Figure 5B:
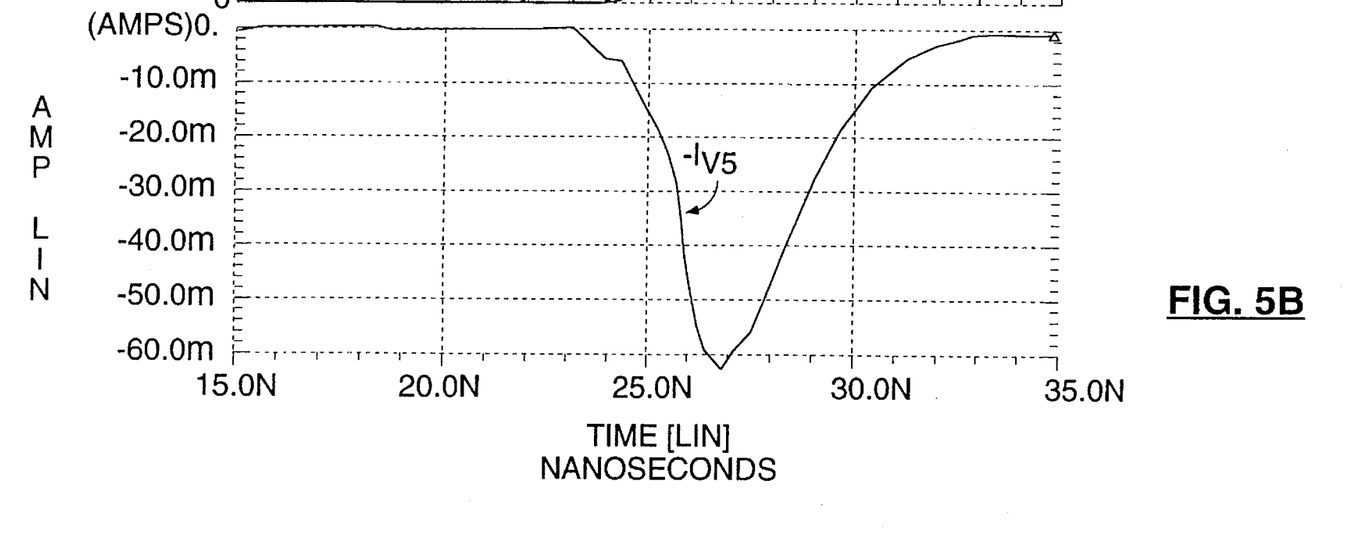

The NAND and NOR gates of tristate logic modules 410, 420, 430 and partial tristate logic module 425 are staggered in size to smooth out the transition of turn ons of the respective power transistors P1–P4 or N1–N3 and thereby further reduce di/dt. FIG. 5A shows a computer simulation of the voltage waveforms developing respectively over time on lines D1, D2, D3 and on the output line 480 in response to DIN switching from 0V to 4.5V (a worst case Vcc=V5 of 4.5V is assumed). FIG. 5B shows the waveshape of current drawn ($-I_{V5}$) through the chip's Vcc power line ($V_{3/5}$ power line) at the same time in terms of amperes, where −60.0M represents a draw of 60 milliamperes. The channel widths/lengths of the individual P and N transistors within NOR gates U411, U421, U431 and NAND gates U412, U422, U432, U442 are set as shown in FIG. 4 to assure smooth transitions as each one the D1, D2, D3 voltage waveforms of FIG. 5A kick in and to thereby produce the relatively smooth $-I_{V5}$ current curve shown in FIG. 5B. The relative smoothness of the $-I_{V5}$ current curve translates into a relatively low di/dt. And the latter advantageously translates into a relatively small amount of Ldi/dt ground bounce across the chip's power leads.

The above disclosure is to be taken as illustrative of the invention, not as limiting its scope or spirit. Numerous modifications and variations will become apparent to those skilled in the art after studying the above disclosure.

Given the above disclosure of general concepts and specific embodiments, the scope of protection sought is to be defined by the claims appended hereto.

What is claimed is:

1. An auto-sensing circuit for determining whether a signal bus is operating in a first signaling mode wherein discrete logic levels are represented by a first set of voltage levels or in a second signaling mode wherein discrete logic levels are represented by a different second set of voltage levels, the signal bus having a bus power line and a bus ground line across which there is established a bus voltage having either a first voltage V1 having a range of V1 (min) to V1 (max) for generating said first set of voltage levels or a second voltage V2 having a range of V2 (min) to V2 (max) for generating said second set of voltage levels in accordance with the signaling mode of the signal bus and where V1 (min) is greater than V2 (max), said auto-sensing circuit comprising:

intermediate level generating means for receiving the first voltage (V1) and for generating an intermediate test voltage V4 as a function of the instantaneous value of the first voltage (V1) where the intermediate test voltage (V4) has a value which is greater than V2 (max) and less than V1 (min); and comparing means, having inputs operatively coupled to the bus power line and to the intermediate level generating means, for comparing the bus voltage with the intermediate test voltage V4 to determine whether the signal bus is operating in the first or second signaling mode.

2. The auto sensing circuit of claim 1 wherein the intermediate level generating means comprises:

a diode where an anode terminal of the diode is connected to the first voltage V1 and a cathode of the diode connected to a first end of a resistor and a second end of the resistor is connected to ground;

said intermediate test voltage V4 generated at the junction of cathode of the diode and the first end of the resistor and has a value of V1—vd where Vd is the voltage drop across the diode; and where V1 (max)—Vd is less than V1 (min) and V1 (min)—Vd is greater than V2 (max).

3. An auto-sensing integrated circuit of claim 1 wherein:

the comparing means further generates a mode indicating signal to indicate whether the signal bus is operating in the first or second signaling mode; and one or more configurable I/O cells, responsive to the mode indicating signal and operatively coupled to the signal bus, the one or more configurable I/O cells switching to either the first or second signaling mode in accordance with the mode indicated by the mode indicating signal.

4. A method for interfacing with a signal bus that can operate either in a first signaling mode wherein discrete logic levels are represented by a first set of voltage levels or in a second signaling mode wherein discrete logic levels are represented by a different second set of voltage levels, the signal bus having a bus power line and a bus ground line across which there is established either a first voltage V1 having a range of V1 (min) to V1 (max) for generating said first set of voltage levels or the second voltage V2 having a range of V2 (min) to V2 (max) for generating said second set of voltage levels in accordance with the signaling mode of the signal bus where V1 (min) is greater than V2 (max), said method comprising the steps of:

generating an intermediate test voltage V4, as a function of the instantaneous value of the first voltage (V1) having a value which is greater than V2 (max) and less than V1 (min); and comparing the voltage of the bus power line with the intermediate test voltage for determining whether the signal bus is operating in the first or second signaling mode.

5. An auto-sensing circuit for determining whether a signal bus is operating in a first signaling mode wherein discrete logic levels are represented by a first set of voltage levels or in a second signaling mode wherein discrete logic levels are represented by a different second set of voltage levels, the signal bus having a bus power line and a bus ground line across which there is established either a first voltage V1 having a range of V1 (min) to V1 (max) for generating said first set of voltage levels or a second voltage V2 having a range of V2 (min) to V2 (max) for generating said second set of voltage levels in accordance with the signaling mode of the signal bus and where V1 (min) is greater than V2 (max), said auto-sensing circuit comprising:

intermediate level generating means, for generating an intermediate test voltage V4 having a value which is greater than V2 (max) and less than V1 (min) and said intermediate level generating means derives the intermediate test voltage from a third voltage V3 having a range of V3 (min) to V3 (max) where the third voltage V3 and the range V3 (max) to V3 (min) is equal to the first voltage V1 and the range V1 (max) and V1 (min); and comparing means, having inputs operatively coupled to the bus power line and to the intermediate level generating means, for comparing the voltage of the bus power line with the intermediate test voltage to determine whether the signal bus is operating in the first or second signaling mode.

6. An auto-sensing circuit for determining whether a signal bus is operating in a first signaling mode wherein discrete logic levels are represented by a first set of voltage levels or in a second signaling mode wherein discrete logic levels are represented by a different second set of voltage levels, the signal bus having a bus power line and a bus ground line across which there is established either a first voltage V1 having a range of V1 (min) to V1 (max) for generating said first set of voltage levels or a second voltage V2 having a range of V2 (min) to V2 (max) for generating said second set of voltage levels in accordance with the signaling mode of the signal bus and where V1 (min) is greater than V2 (max), said auto-sensing circuit comprising:

intermediate level generating means, for generating an intermediate test voltage V4 having a value which is greater than V2 (max) and less than V1 (min) and said intermediate level generating means derives said intermediate test voltage from a third voltage V3 having a range of V3 (min) to V3 (max), the first voltage V1 and the third voltage V3 are generate from a common power source; and comparing means, having inputs operatively coupled to the bus power line and to the intermediate level generating means, for comparing the voltage of the bus power line with the intermediate test voltage to determine whether the signal bus is operating in the first or second signaling mode.

7. An auto-sensing circuit for determining whether a signal bus is operating in a first signaling mode wherein discrete logic levels are represented by a first set of voltage levels or in a second signaling mode wherein discrete logic levels are represented by a different second set of voltage levels, the signal bus having a bus power line and a bus ground line across which there is established either a first voltage V1 having a range of V1 (min) to V1 (max) for generating said first set of voltage levels or a second voltage V2 having a range of V2 (min) to V2 (max) for generating said second set of voltage levels in accordance with the signaling mode of the signal bus and where V1 (min) is greater than V2 (max), said auto-sensing circuit comprising:

intermediate level generating means, for generating an intermediate test voltage V4 having a value which is greater than V2 (max) and less than V1 (min) wherein the intermediate level generating means comprises:
    a diode where an anode terminal of the diode is connected to a third voltage V3 having a range of V3 (min) to V3 (max) and a cathode of the diode connected to a first end of a resistor and a second end of the resistor is connected to ground;
  the intermediate test voltage being generated at the junction of cathode of the diode and the first end of the resistor and has a value of V3—Vd where Vd is the voltage drop across the diode; and
  where V3 (max)—Vd is less than V1 (min) and V3(min)—Vd is greater than V2 (max); and comparing means, having inputs operatively coupled to the bus power line and to the intermediate level generating means, for comparing the voltage of the bus power line with the intermediate test voltage to determine whether the signal bus is operating in the first or second signaling mode.

* * * * *

UNITED STATES PATENT AND TRADEMARK OFFICE
CERTIFICATE OF CORRECTION

PATENT NO. : 5,534,801
DATED     : July 9, 1996
INVENTOR(S) : Chih-Siung Wu et al.

It is certified that error appears in the above-indentified patent and that said Letters Patent is hereby corrected as shown below:

Column 5, line 63, "28" should be --128--.
Column 6, line 46, "3226i" should be --322i-.
Column 10, line 57, "generate" should be --generated--.

Signed and Sealed this

Twelfth Day of November, 1996

Attest:

BRUCE LEHMAN

*Attesting Officer*        *Commissioner of Patents and Trademarks*